(12) United States Patent
Yonezawa

(10) Patent No.: US 9,200,928 B2
(45) Date of Patent: Dec. 1, 2015

(54) POSITION DETECTOR

(71) Applicant: CANON KABUSHIKI KAISHA, Tokyo (JP)

(72) Inventor: Takeshi Yonezawa, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 60 days.

(21) Appl. No.: 14/228,362

(22) Filed: Mar. 28, 2014

(65) Prior Publication Data
US 2014/0292311 A1 Oct. 2, 2014

(30) Foreign Application Priority Data

Mar. 28, 2013 (JP) ................. 2013-068082

(51) Int. Cl.
*G01B 7/14* (2006.01)
*G01B 7/30* (2006.01)
*H01F 5/00* (2006.01)
*G01D 5/347* (2006.01)
*G01D 5/245* (2006.01)

(52) U.S. Cl.
CPC .......... *G01D 5/34792* (2013.01); *G01D 5/2452* (2013.01); *G01D 5/34715* (2013.01)

(58) Field of Classification Search
CPC . G01B 7/003; G01D 5/2452; G01D 5/34715; G01D 5/34792
USPC ............ 324/51, 55, 200, 207.11, 207.13, 324/207.15, 207.16, 207.17
See application file for complete search history.

(56) References Cited

U.S. PATENT DOCUMENTS 6,772,078 B2 * 8/2004 Uehira ............................ 702/85
6,912,476 B2 * 6/2005 Huber-Lenk et al. ......... 702/150
2012/0116715 A1 * 5/2012 Yoshitake et al. ............ 702/150

FOREIGN PATENT DOCUMENTS

| JP | 0545151 A | 2/1993 |
| JP | 08304113 A | 11/1996 |
| JP | 2012098241 A | 5/2012 |

* cited by examiner

*Primary Examiner* — Jermele M Hollington
*Assistant Examiner* — Raul Rios Russo
(74) *Attorney, Agent, or Firm* — Rossi, Kimms & McDowell LLP

(57) ABSTRACT

A position detector detecting a position of a movable member relative to a fixed member, including: a signal detector detecting periodic signals each indicating a predetermined value for the position of the movable member; a signal processor generating displacement signals based on the detected periodic signals and switching the generated displacement signals in a predetermined cycle to sequentially output the displacement signals; a position calculator calculating the position of the movable member based on a first signal group of the displacement signals; and a movement amount calculator calculating a movement amount of the movable member within the predetermined cycle by using a second signal group contained in the first signal group formed by obtaining the same displacement signal at different times. The position calculator calculates the position of the movable member based on the first signal group and the movement amount.

8 Claims, 14 Drawing Sheets

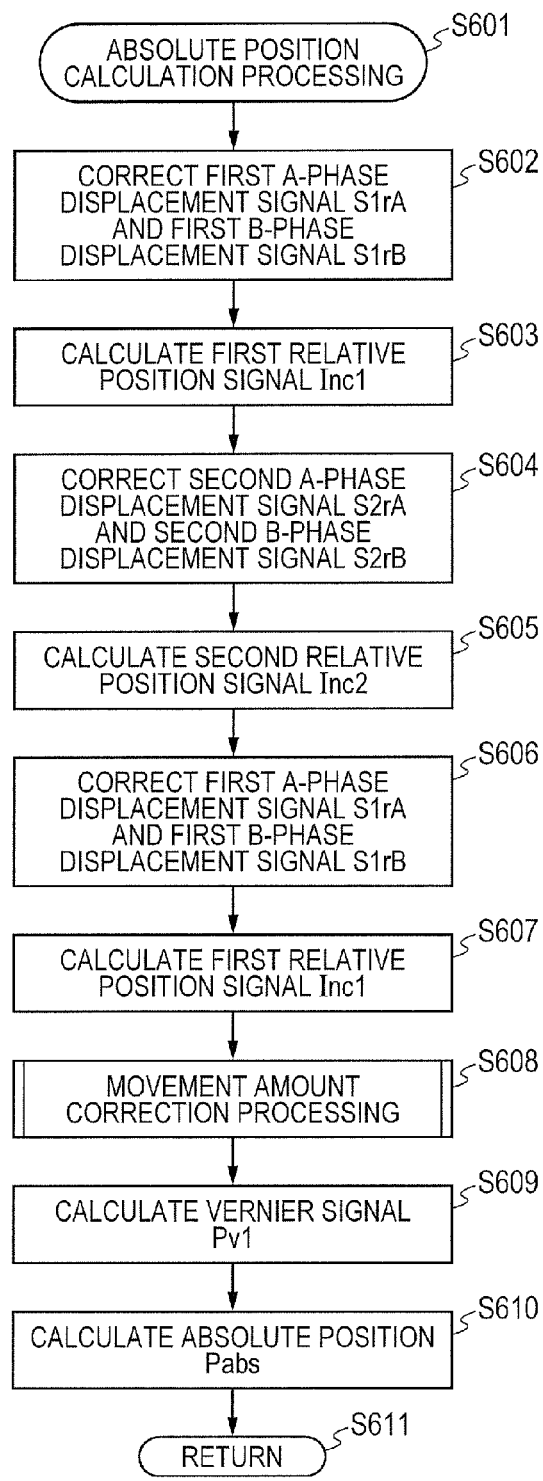

FIG. 7A Atan1
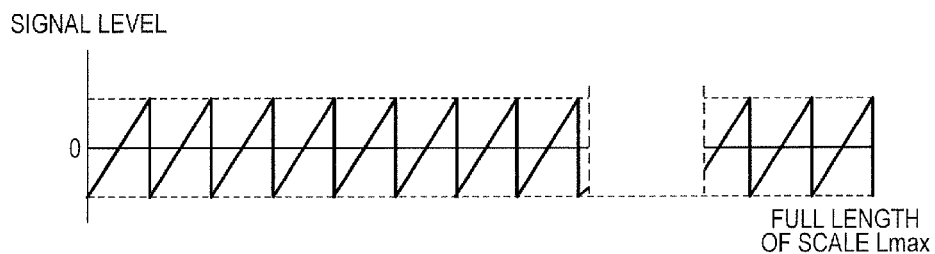
FIG. 7B Inc1
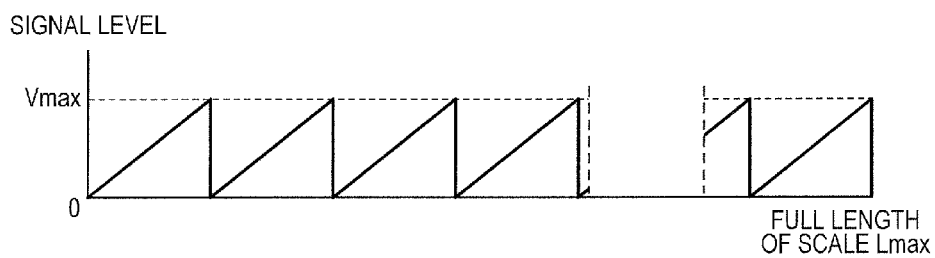
FIG. 7C Inc2
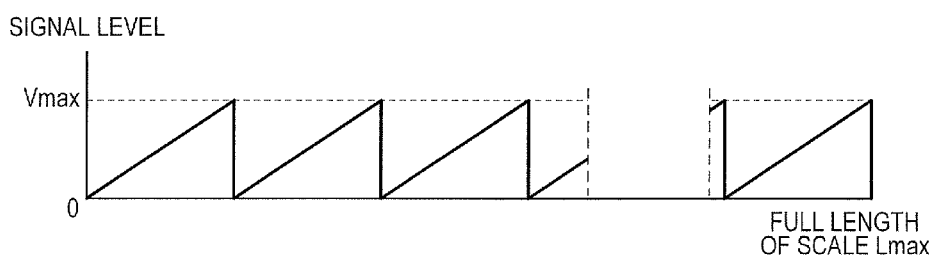
FIG. 7D Pv1
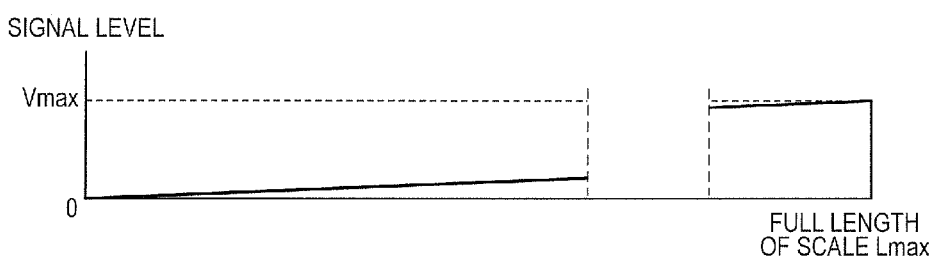

FIG. 16A  Inc1
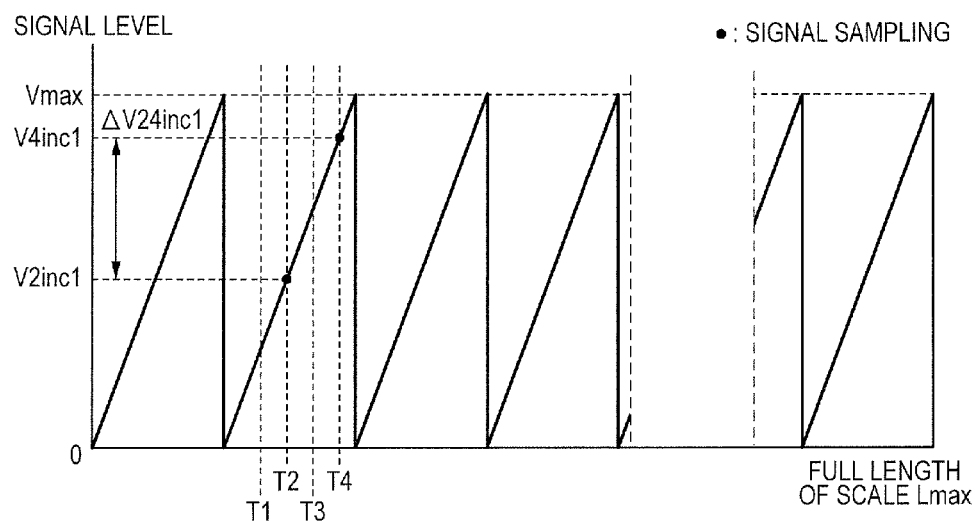
FIG. 16B  Inc2
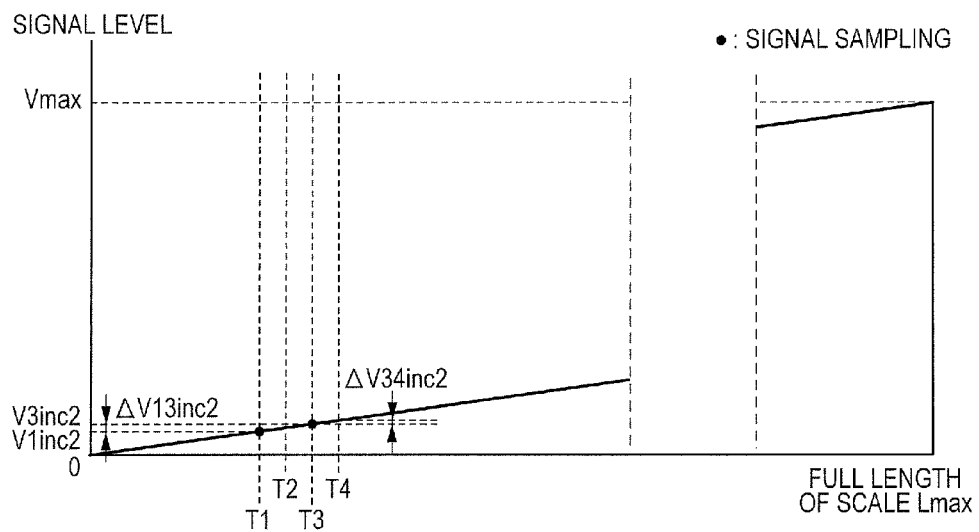

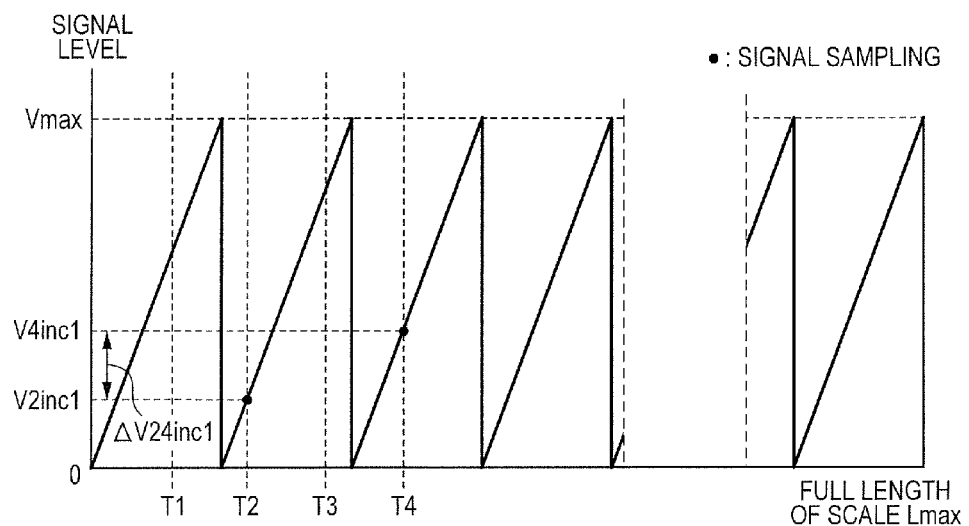
FIG. 17A  Inc1
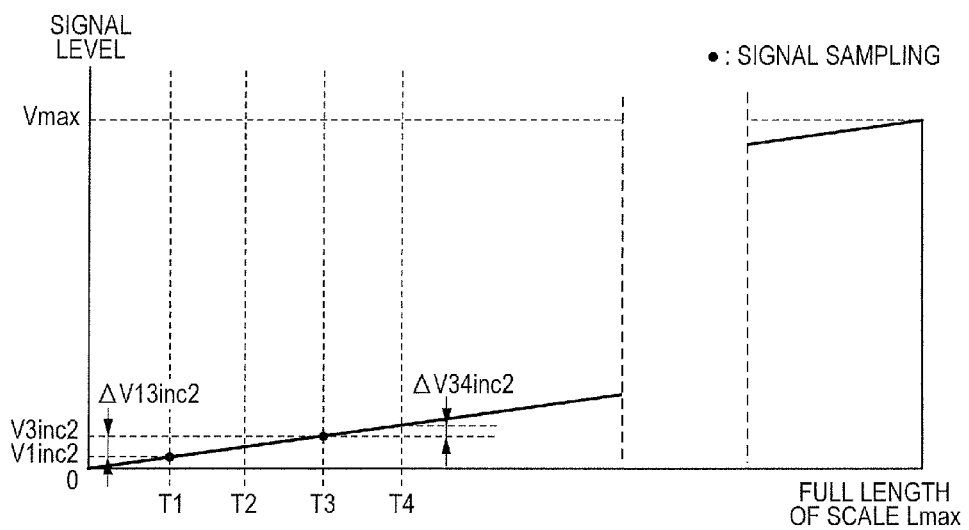
FIG. 17B  Inc2

POSITION DETECTOR

BACKGROUND OF THE INVENTION

1. Field of the Invention

The present invention relates to a position detector for detecting a position of a movable member, in particular, a position detector for detecting a position of a movable member based on multiple signals.

2. Description of the Related Art

As an apparatus for measuring a distance of movement of an object, besides an incremental encoder for measuring a distance of relative movement, there is hitherto known an absolute encoder capable of detecting an absolute position.

Japanese Patent Application Laid-Open No. H08-304113 discloses a Vernir type absolute encoder. The Vernir type absolute encoder disclosed in Japanese Patent Application Laid-Open No. H08-304113 has a configuration including a main track and at least one sub track, which are formed by grid patterns having different pitches. Based on a slight shift between detected signals, which is generated due to a difference in pitch between the tracks, detection of an absolute position in a section within which relative shifts among the signals originating from the grid patterns show a single cycle can be performed by the Vernir type absolute encoder.

Japanese Patent Application Laid-Open No. H05-45151 discloses timing of switching to an absolute counting operation in the Vernier type absolute encoder. The Vernier type absolute encoder has a configuration in which tracks are formed at smaller pitches and at larger pitches. As the timing of switching to the absolute counting operation based on the tracks described above, when a speed is lowered to a speed at which erroneous detection does not occur in an incremental measurement at the smaller pitches, an operation of the Vernier type absolute encoder is switched to the absolute counting operation.

However, the absolute encoder disclosed in Japanese Patent Application Laid-Open No. H08-304113 has the following problems. When the absolute position is calculated from the signals of the multiple tracks, synchronism of the signals of the multiple tracks of the absolute encoder is generally required to be ensured. This is because the calculation of the absolute position presupposes that the signals of the multiple tracks are signals generated when the position of an object to be measured is identical or within an allowable range. In the case where the signals of the multiple tracks are detected in time division, the signals of the multiple tracks are signals corresponding to different positions of the object to be measured when the object to be measured is in a moving state. Therefore, the above-mentioned presupposition is not established. As a result, there arises a problem in that a precise absolute position cannot be calculated. On the other hand, there is a method using a sample-hold circuit to ensure the synchronism of the signals of the multiple tracks. However, the method described above has a problem in that costs are increased due to an additional circuit or extra time is required to hold the signals.

Moreover, the absolute encoder disclosed in Japanese Patent Application Laid-Open No. H05-45151 has the following problem. Japanese Patent Application Laid-Open No. H05-45151 only examines erroneous detection in the incremental measurement at the smaller pitches as erroneous detection because the detection of the signals of the multiple tracks in time division is not supposed. In order to calculate a precise absolute position, however, it is important for the signals of the multiple tracks to be signals obtained when the object to be measured is located within the allowable range. Therefore, even when there is no erroneous detection in the incremental measurement at the smaller pitches, it cannot be said that the synchronism of the signals of the multiple tracks is ensured. Therefore, a precise absolute position cannot be calculated. Specifically, if the calculation of the absolute position is determined based on an erroneous detection of the incremental measurement at the smaller pitches, there arises a problem in that a wrong absolute position is disadvantageously calculated.

SUMMARY OF THE INVENTION

The present invention provides a position detector which detects a position of a movable member relative to a fixed member, including: a signal detector configured to detect multiple periodic signals each indicating a predetermined value for the position of the movable member; a signal processor configured to generate multiple displacement signals based on the multiple periodic signals detected by the signal detector and switch the multiple generated displacement signals in a predetermined cycle to sequentially output the multiple displacement signals; a position calculator configured to calculate the position of the movable member based on a first signal group, the first signal group being the multiple displacement signals sequentially output by the signal processor; and a movement amount calculator configured to calculate a movement amount of the movable member within the predetermined cycle, in which: the first signal group contains a second signal group formed by obtaining the same displacement signal at different times; the movement amount calculator calculates the movement amount of the movable member within the predetermined cycle by using the second signal group; and the position calculator calculates the position of the movable member based on the first signal group and the movement amount.

According to one embodiment of the present invention, the position detector having high reliability, which is capable of detecting the position with high accuracy while realizing the reduction of a circuit configuration in size, can be provided.

Further features of the present invention will become apparent from the following description of exemplary embodiments with reference to the attached drawings.

BRIEF DESCRIPTION OF THE DRAWINGS

FIG. 6 is a flowchart of an absolute position calculation.

FIG. 7A is a graph showing an arc tangent signal.

FIG. 7B is a graph showing a first relative position signal.

FIG. 7C is a graph showing a second relative position signal.

FIG. 7D is a graph showing a Vernier signal.

FIGS. 16A and 16B are graphs showing the first relative position signal, the second relative position signal, and signal acquisition positions when a movable member is moving at a low speed.

FIGS. 17A and 17B are graphs showing the first relative position signal, the second relative position, and the signal acquisition positions when the movable member is moving at a high speed.

DESCRIPTION OF THE EMBODIMENTS

In the following, exemplary embodiments of the present invention are described in detail referring to the accompanying drawings.

First Embodiment

In the following, a position detector according to a first embodiment of the present invention is described referring to FIGS. 1 to 11.

Figure 1:
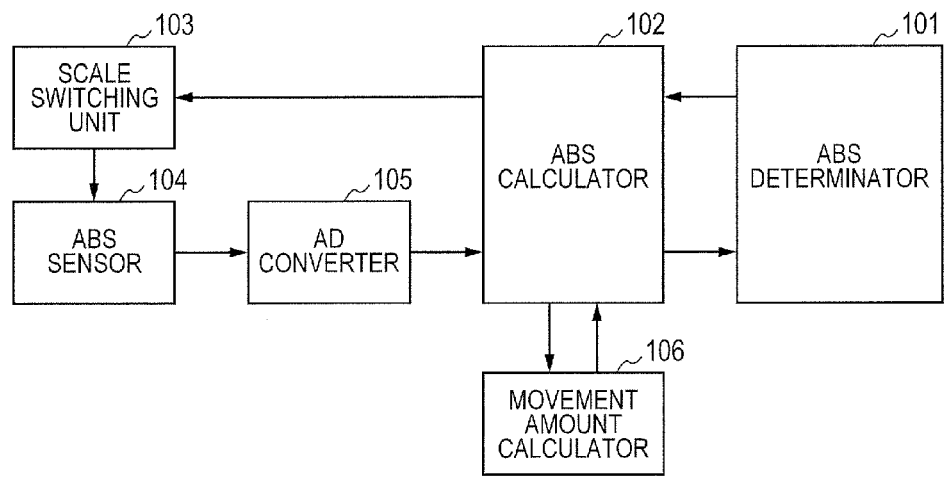
FIG. 1 is a configuration block diagram according to a first embodiment of the present invention.

FIG. 1 is a configuration block diagram of the position detector according to the first embodiment of the present invention. In FIG. 1, an ABS calculator 102 is a computing unit for calculating an absolute position Pabs which is a displacement amount of a movable member with respect to a fixed member (that is, with respect to a predetermined reference position) based on a signal output from an ABS sensor 104. A scale switching unit (switching unit) 103 is a scale switching unit for switching two types of signal outputs generated by two types of track patterns, which are sequentially output from the ABS sensor 104. The ABS sensor (signal detector) 104 is an absolute position sensor for outputting a signal for calculating an absolute position of the movable member with respect to the fixed member. An internal configuration and the output signals of the ABS sensor 104 are described later. An AD converter 105 is an AD converter for converting an analog signal output from the ABS sensor 104 into a digital signal.

A movement amount calculator 106 is a movement amount calculator for calculating the amount of movement of the movable member between a time at which one of the two types of signals is obtained and a time at which the other of the two types of signals is obtained by the ABS calculator 102 and for performing a correction. Movement amount correction processing is described in detail below.

An ABS determinator 101 is an absolute position determinator for requesting the ABS calculator 102 to calculate the absolute position and for determining the absolute position Pabs calculated by the ABS calculator 102 as a final absolute position.

The ABS determinator 101, the ABS calculator 102, and the movement amount calculator 106 can be configured in, for example, a single CPU.

Next, the internal configuration and the output signals of the ABS sensor 104 are described below.

Figure 2:
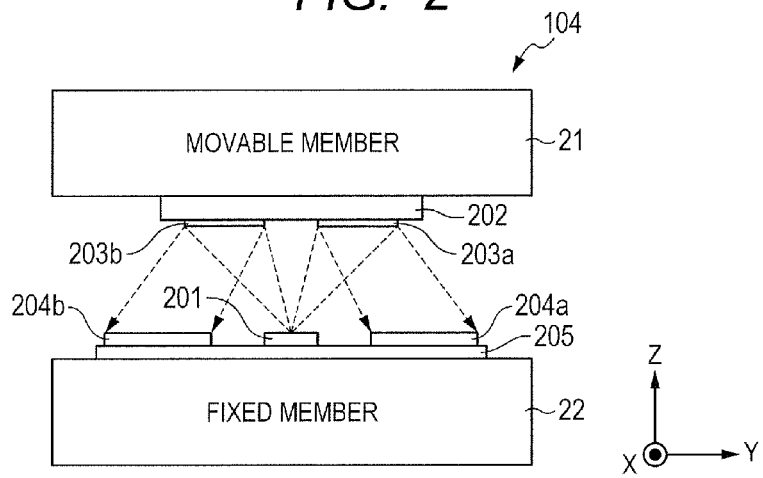
FIG. 2 is a sectional view of an ABS sensor.

FIG. 2 is a sectional view of the ABS sensor 104. In FIG. 2, a movable member 21 is a movable portion capable of moving in an X-axis direction which is vertical to a paper plane. A fixed member 22 is a member which serves as a reference of the absolute position of the movable member 21. A light source 201 is a light emitting unit, and is, for example, an LED. A scale unit 202 is a scale unit including two track patterns 203a and 203b, respectively having different numbers of slits provided at equal intervals over a full length. A light receiver 204a is a light receiver for receiving light which is emitted from the light source 201 and is reflected by the track pattern 203a. Similarly, a light receiver 204b is a light receiver for receiving light which is emitted from the light source 201 and reflected by the track pattern 203b. The light receivers 204a and 204b are, for example, photodiode arrays. A signal processing circuit 205 is a signal processing circuit for processing the signals of the light received by the light receivers 204a and 204b and for outputting any of the signals of the track patterns 203a and 203b in accordance with a switch signal from the scale switching unit 103. In this embodiment, the configuration in which the scale unit 202 is provided to the movable member 21 and the light source 201 and the light receivers 204a and 204b are provided to the fixed member 22 is exemplified. However, the configuration is not limited thereto. The scale unit 202 only needs to be provided to one of the fixed member 21 and the movable member 22, whereas the light source 201 and the light receivers 204a and 204b need to be provided to the other of the fixed member 21 and the movable member 22. The same also applies to an embodiment described later.

Figure 3:
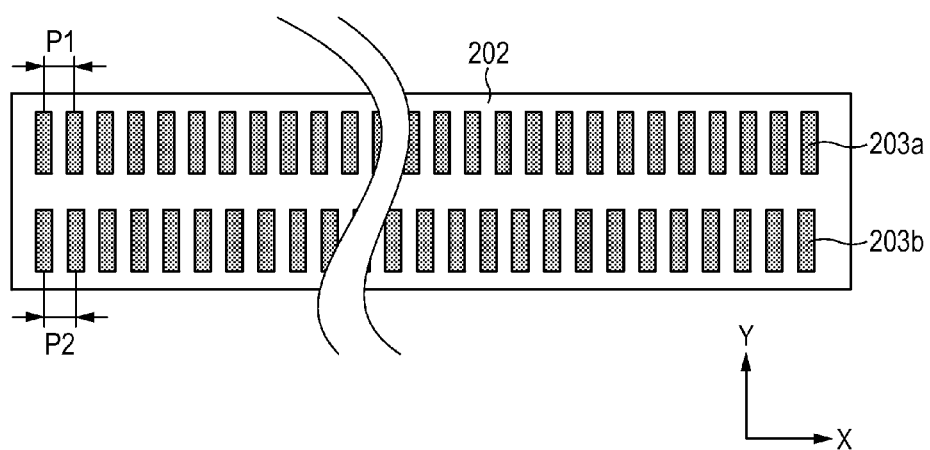
FIG. 3 is a plan view of a scale unit according to the first embodiment.

FIG. 3 is a plan view of the scale unit 202 according to the first embodiment. In FIG. 3, reflective type slit patterns (reflective pattern arrays) are illustrated as an example. The scale unit 202 includes two track patterns, that is, the first track pattern 203a and the second track pattern 203b. The scale unit 202 is configured as follows. When the light emitted from the light source 201 is incident on reflective portions (black portions) of the track patterns 203a and 203b, the light is reflected to the respective light receivers 204a and 204b. The reflective portions of the first track pattern 203a are formed at equal pitches P1. The reflective portions of the second track pattern 203b are formed at equal pitches P2. In this embodiment, the pitch P1 is determined so that forty reflective portions are formed over a full length Lmax of the scale, that is, to have forty cycles over the full length Lmax. The pitch P2 is determined so that thirty-nine reflective portions are formed over the full length Lmax of the scale, that is, to have thirty-nine cycles over the full length Lmax.

Figure 4:
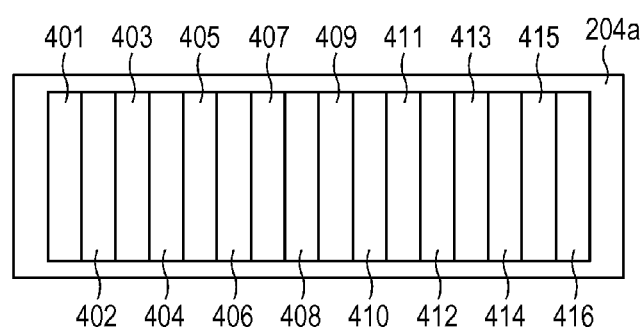
FIG. 4 is a plan view of a light receiver.

FIG. 4 is a plan view of the light receiver 204a. The light receiver 204b has the same configuration as that of the light receiver 204a. Sixteen photodiodes 401 to 416 are arranged on the light receiver 204a at equal intervals in a horizontal direction. The photodiodes 401, 405, 409, and 413 are electrically connected to each other. A group formed by the photodiodes 401, 405, 409, and 413 is referred to as "phase a". A group formed by the photodiodes 402, 406, 410, and 414 is referred to as "phase b". Similarly, a group formed by the photodiodes 403, 407, 411, and 415 is referred to as "phase c", and a group formed by the photodiodes 404, 408, 412, and 416 is referred to as "phase d". This embodiment is described based on the presupposition that a length for four photodiodes included in the light receiver 204a in a direction of arrangement of the photodiodes (for example, a distance from an end of the photodiode 401 to an end of the photodiode 404) is twice as large as the pitch P1 of the reflective portions of the first track pattern 203a. An optical path length of light which is emitted from the light source 201 and reflected by the reflective portions of the first track pattern 203a to be incident on the light receiver 204a becomes twice as large as an optical path length from the light source 201 to the reflective portions of the first track pattern 203a. Therefore, a width of the reflected light received by the light receiver 204a is twice as large as the width at the reflective portion. Therefore, the length for the four photodiodes included in the light receiver 204a in the direction of arrangement of the photodiodes corresponds to one cycle of the pattern of the first track pattern 203a.

When the light from the light source 201, which is reflected by the first track pattern 203a, is received by the light receiver 204a, the phase-a, phase-b, phase-c, and phase-d photodiode groups respectively output photo-electric currents corresponding to the received light amounts. With the movement of the scale unit 202 in the X-axis direction, the phase-a, phase-b, phase-c, and phase-d photodiode groups output the currents (periodic signals) fluctuating in the following phase relationships. Specifically, with respect to the current in the phase a as a reference, the current fluctuates at 90° for the phase b, at 180° for the phase c, and at 270° for the phase d. The signal processing circuit 205 converts the output currents into voltages by a current-voltage converter. Next, the signal processing circuit 205 obtains a differential component between the phase a and the phase c and a differential component between the phase b and the phase d by a differential amplifier. Next, the signal processing circuit 205 generates, from the differential component between the phase a and the phase c and the differential component between the phase b and the phase d, a first A-phase displacement signal S1rA which is a A-phase displacement signal of the first track pattern 203a and a first B-phase displacement signal S1rB which is a B-phase displacement signal thereof whose phase is shifted by 90° from the phase of the first A-phase displacement signal S1rA. In a similar manner, for the light received by the light receiver 204b, a second A-phase displacement signal S2rA and a second B-phase displacement signal S2rB which are respectively a A-phase displacement signal and a B-phase displacement signal of the second track pattern 203b are also generated.

The signal processing circuit 205 outputs any one of a set of the first A-phase displacement signal S1rA and the first B-phase displacement signal S1rB and a set of the second A-phase displacement signal S2rA and the second B-phase displacement signal S2rB in accordance with a switch signal from the scale switching unit 103.

As described above, the ABS sensor 104 outputs any one of the set of the first A-phase displacement signal S1rA and the first B-phase displacement signal S1rB and the set of the second A-phase displacement signal S2rA and the second B-phase displacement signal S2rB in accordance with the switch signal from the scale switching unit 103.

Figure 5:
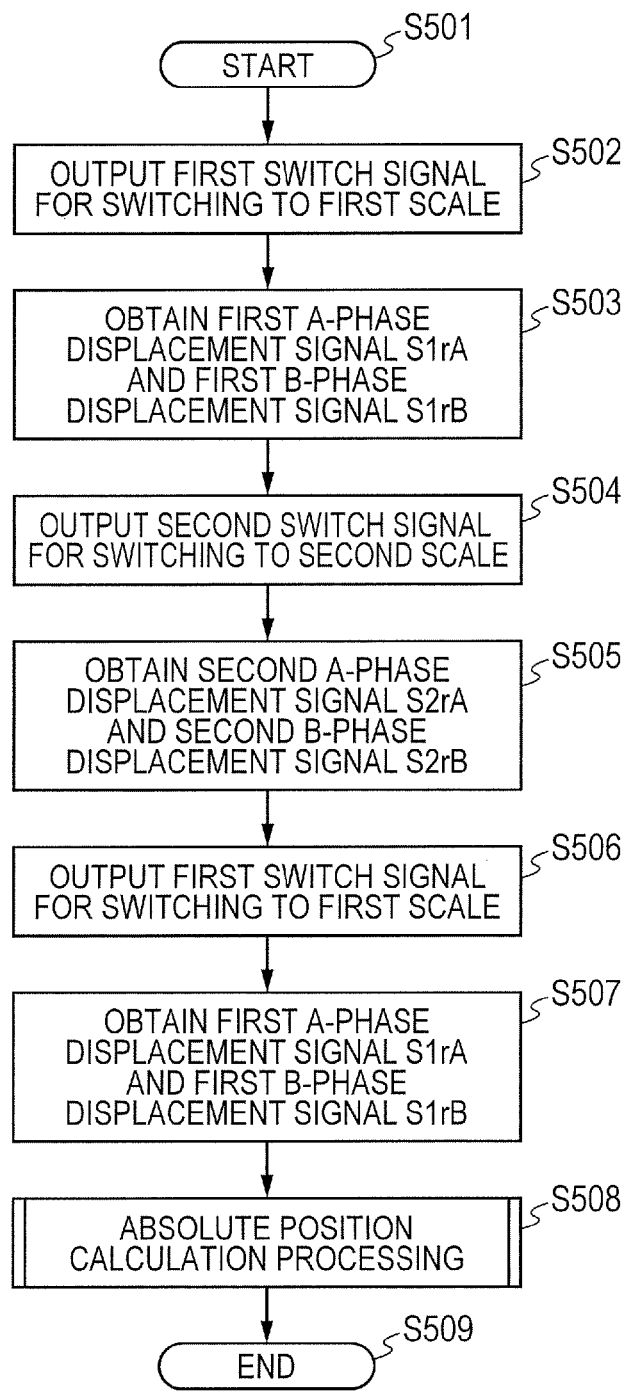
FIG. 5 is a flowchart of signal acquisition.

Next, an operation of the first embodiment is described referring to FIGS. 5 and 6. FIG. 5 illustrates an operation flow of the first embodiment.

In Step S501, processing starts and then proceeds to Step S502. Processing for determining the absolute position Pabs is started by a request for calculating the absolute position Pabs issued by the ABS determinator 101 to the ABS calculator 102.

In Step S502, the ABS calculator 102 outputs a first switch signal for switching to a first scale to the scale switching unit 103. Then, the processing proceeds to Step S503. Based on the first switch signal, the scale switching unit 103 instructs the ABS sensor 104 to output the signals of the first track pattern. Then, the ABS sensor 104 outputs the signals S1rA and S1rB of the first track pattern. The signals S1rA and S1rB of the first track pattern are converted into digital signals by the AD converter 105 and are then output to the ABS calculator 102.

In Step S503, a signal level V1s1rA of the first A-phase displacement signal S1rA and a signal level V1s1rB of the first B-Phase displacement signal S1rB at an execution timing T1 of Step S503, which are output from the AD converter 105, are obtained. Then, the processing proceeds to Step S504.

In Step S504, the ABS calculator 102 outputs, to the scale switching unit 130, a second switch signal for switching to a second scale. Then, the processing proceeds to Step S505. Based on the second switch signal, the scale switching unit 103 instructs the ABS sensor 104 to output the signals of the second track pattern. Then, the ABS sensor 104 outputs the signals S2rA and S2rB of the second track pattern. The signals S2rA and S2rB of the second track pattern are converted into digital signals by the AD converter 105 and are then output to the ABS calculator 102.

In Step S505, a signal level V2s2rA of the second A-phase displacement signal S2rA and a signal level V2s2rB of the second B-Phase displacement signal S2rB at an execution timing T2 of Step S505, which are output from the AD converter 105, are obtained. Then, the processing proceeds to Step S506.

In Step S506, the ABS calculator 102 outputs, to the scale switching unit 130, the first switch signal for switching to the first scale. Then, the processing proceeds to Step S507.

In Step S507, a signal level V3s1rA of the first A-phase displacement signal S1rA and a signal level V3s1rB of the first B-Phase displacement signal S1rB at an execution timing T3 of Step S507, which are output from the AD converter 105, are obtained. Then, the processing proceeds to Step S508.

In Step S508, the absolute position Pabs is calculated based on the signals of the respective track patterns, which are obtained in Steps S503, S505, and S507. Then, the processing proceeds to Step S509. A method for calculating the absolute position is described later.

In Step S509, the processing ends. The absolute position Pabs is output to the ABS determinator 101. The ABS determinator 101 determines the absolute position Pabs calculated by the ABS calculator 102 as the absolute position of the movable member 12. By the processing described above, the absolute position of the movable member is determined.

Next, the method for calculating the absolute position is described. The absolute position is calculated by the ABS calculator 102. FIG. 6 illustrates a flow of the absolute position calculation.

In Step S601, the processing starts. Then, the processing proceeds to Step S602.

In Step S602, the signal level V1s1rA of the first A-phase displacement signal S1rA and the signal level V1s1rB of the first B-phase displacement signal S1rB at the execution timing T1, which are obtained in Step S503 illustrated in FIG. 5, are corrected.

The first A-phase displacement signal S1rA and the first B-phase displacement signal S1rB have different signal offsets or signal amplitudes in some cases. If the signals having different signal offsets or signal amplitudes are directly used for the absolute position calculation, an error may be generated in the calculated absolute position Pabs. Therefore, the signals are required to be corrected.

In this embodiment, as described above, the length for the four photodiodes included in the light receiver 204a in the direction of arrangement of the photodiodes (for example, the distance from the end of the photodiode 401 to the end of the photodiode 404) is twice as large as the pitch P1 of the reflective portions of the first track pattern 203a. Therefore, the first A-phase displacement signal S1rA and the first B-phase displacement signal S1rB are respectively expressed as Expressions (1) and (2) below.

$$S1rA: a1 \times \cos\theta + s1 \quad (1)$$

$$S1rB: a2 \times \sin\theta + s2 \quad (2)$$

In Expressions (1) and (2), a1 is an amplitude of the first A-phase displacement signal S1rA and s1 is an offset of the first A-phase displacement signal, a2 is an amplitude of the first B-phase displacement signal S1rB and s2 is an offset of the first B-phase displacement signal, and θ is a phase of the signal. The first A-phase displacement signal S1rA has a maximum value of s1+a1, a minimum value of s1−a1, the signal amplitude of a1, and an average value of s1. Similarly, the second B-displacement signal has a maximum value of s2+a2, a minimum value of s2−a2, the signal amplitude of a2, and an average value of s2. By using the values described above, the first A-phase displacement signal S1rA and the first B-phase displacement signal S1rB respectively expressed by Expressions (1) and (2) are corrected. Then, a corrected first A-phase displacement signal S1cA and a corrected first B-phase displacement signal S1cB are expressed as Expressions (3) and (4) below.

$$S1cA: \{(a1 \times \cos\theta + s1) - s1\} \times a2 = a1 \times a2 \times \cos\theta \quad (3)$$

$$S1cB: \{(a2 \times \sin\theta + s2) - s2\} \times a1 = a1 \times a2 \times \sin\theta \quad (4)$$

As a result, the offsets of the first A-phase displacement signal S1rA and the first B-phase displacement signal S1rB are removed to obtain the first A-phase displacement signal S1cA and the first B-phase displacement signal S1cB having the same signal amplitude.

After the first A-phase displacement signal S1rA and the first B-phase displacement signal S1rB are corrected in Step S602 by the processing described above, the processing proceeds to Step S603.

In Step S603, by using the corrected first A-phase displacement signal S1cA and the corrected first B-phase displacement signal S1cB, a first relative position signal Inc1 having forty cycles over the full length of the scale and a wave height Vmax as shown in FIG. 7B is calculated. Then, the processing proceeds to Step S604. The horizontal axis of FIGS. 7A to 7D indicates the position on the full length Lmax of the scale, whereas the vertical axis indicates a signal level at the position.

First, by using the corrected first A-phase displacement signal S1cA and the corrected first B-phase displacement signal S1cB, an arctangent calculation is performed to calculate a signal Atan1 as shown in FIG. 7A. The first track pattern 203a is a pattern which has forty cycles over the full length Lmax of the scale. Therefore, the signal Atan1 has eighty cycles over the full length of the scale.

Next, the first relative position signal Inc1 having forty cycles over the full length of the scale and the wave height Vmax is calculated from the signal Atan1. Specifically, a gain is applied to the signal Atan1 so that the wave height of the signal Atan1 becomes Vmax/2. The signal level is offset so that the signal level becomes 0 when the phase of the first B-phase displacement signal S1rB is at 0°. Then, by adding Vmax/2 when the phase is in the range from 180° to 360°, the first relative position signal Inc1 is calculated. Therefore, the first relative position signal Inc1 becomes a saw-tooth wave having forty cycles over the full length Lmax of the scale, as shown in FIG. 7B.

In Steps S602 and S603 described above, a signal level V1inc1 of the first relative position signal Inc1 at the execution timing T1 is calculated from the signal level V1s1rA of the first A-phase displacement signal S1rA and the signal level V1s1rB of the first B-phase displacement signal S1rB at the execution timing T1. Then, the processing proceeds to Step S604.

In Step S604, the signal level V2s2rA of the second A-phase displacement signal S2rA and the signal level V2s2rB of the second B-phase displacement signal S2rB at the execution timing T2, which are obtained in Step S505 illustrated in FIG. 5, are corrected.

The light receiver 204b has the same configuration as the light receiver 204a. Therefore, the length for four photodiodes included in the light receiver 204b in the direction of arrangement of the photodiodes (for example, the distance from the end of the photodiode 401 to the end of the photodiode 404) is twice as large as the pitch P1 of the reflective portions of the first track pattern 203a. The pitch P1 of the reflective portions of the first track pattern 203a and the pitch P2 of the reflective portions of the second track pattern 203b are different from each other. Therefore, the length for four photodiodes included in the light receiver 204b in the direction of arrangement of the photodiodes (for example, the distance from the end of the photodiode 401 to the end of the photodiode 404) does not become twice as large as the pitch P2 of the reflective portions of the second track pattern 203b. Therefore, the second A-phase displacement signal S2rA and the second B-phase displacement signal S2rB have a relationship in which the phase shift therebetween is not 90°.

Thus, the second A-phase displacement signal S2rA and the second B-phase displacement signal S2rB are respectively expressed by Expressions (5) and (6) below.

$$S2rA: b1 \times \cos\theta + t1 \quad (5)$$

$$S2rB: b2 \times \sin(\theta + \alpha) + t2 \quad (6)$$

In Expressions (5) and (6), b1 is an amplitude of the second A-phase displacement signal S2rA and t1 is an offset of the second A-phase displacement signal S2rA, b2 is an amplitude of the second B-phase displacement signal S2rB and t2 is an offset of the second B-phase displacement signal S2rB, θ is a phase of the signal, and α is a shift amount of the phase. When the second A-phase displacement signal S2rA and the second B-phase displacement signal S2rB are corrected in the same manner as in the processing performed in Step S602, a corrected second A-phase displacement signal S2cA' and a corrected second B-phase displacement signal S2cB' are expressed by Expressions (7) and (8) below.

$$S2cA': \{(b1 \times \cos\theta + t1) - t1\} \times b2 = b1 \times b2 \times \cos\theta \quad (7)$$

$$S2cB': \{(b2 \times \sin(\theta + \alpha) + t2) - t2\} \times b1 = b1 \times b2 \times \sin\theta(\theta + \alpha) \quad (8)$$

As a result, the offset t1 of the second A-phase displacement signal S2rA and the offset t2 of the second B-phase displacement signal S2rB are removed to obtain the second A-phase displacement signal S2cA' and the second B-phase displacement signal S2cB' having the same signal amplitude.

Next, processing for setting a phase difference between the second A-phase displacement signal S2cA' and the second B-phase displacement signal S2cB' to 90° by using Expressions (7) and (8) is described below.

A difference between Expressions (7) and (8) and the sum of Expressions (7) and (8) are respectively expressed by Expressions (9) and (10) below.

$$b1 \times b2 \times (\sin(\theta+\alpha) - \cos\theta) = b1 \times b2 \times 2 \times \sin\{(\alpha-90)/2\} \times \cos\{\theta+(\alpha+90)/2\} \quad (9)$$

$$b1 \times b2 \times (\sin(\theta+\alpha) + \cos\theta) = b1 \times b2 \times 2 \times \cos\{(\alpha-90)/2\} \times \sin\{\theta+(\alpha+90)/2\} \quad (10)$$

The phase difference given by Expressions (9) and (10) becomes 90° by the calculations described above.

The amplitudes in Expressions (9) and (10) are different from each other. Therefore, the amplitudes are next corrected to calculate a second A-phase displacement signal S2cA and a second B-phase displacement signal S2cB having the same signal amplitude. Expression (9) is multiplied by cos {(α−90)/2} which is a part of the amplitude in Expression (10), and Expression (10) is multiplied by sin {(α−90)/2} which is a part of the amplitude in Expression (9). Then, the following Expressions (11) and (12) are obtained.

$$\text{second } A\text{-phase displacement signal } S2cA : b1 \times b2 \times 2 \times \sin\{(\alpha-90)/2\} \times \cos\{(\alpha-90)/2\} \times \cos\{\theta+(\alpha+90)/2\} \quad (11)$$

$$\text{second } B\text{-phase displacement signal } S2cB : b1 \times b2 \times 2 \times \sin\{(\alpha-90)/2\} \times \cos\{(\alpha-90)/2\} \times \sin\{\theta+(\alpha+90)/2\} \quad (12)$$

As a result, the offsets of the second A-phase displacement signal S2rA and the second B-phase displacement signal S2rB are removed so that the second A-phase displacement signal S2cA and the second B-phase displacement signal S2cB having the same signal amplitude and the phase difference of 90° are obtained.

After the second A-phase displacement signal S2rA and the second B-phase displacement signal S2rB are corrected in Step S604 by the processing described above, the processing proceeds to Step S605.

In Step S605, the same computation as that performed in Step S603 is performed using the corrected second A-phase displacement signal S2cA and the corrected second B-phase displacement signal S2cB to calculate a second relative position signal Inc2. The second track pattern 203b is a pattern having thirty-nine cycles over the full length Lmax of the scale. Therefore, the second relative position signal Inc2 becomes a saw-tooth wave having thirty-nine cycles over the full length Lmax of the scale, as shown in FIG. 7C. The horizontal axis of FIGS. 7A to 7D indicates the position on the full length Lmax of the scale, whereas the vertical axis indicates the signal level at the position.

By the processing in Steps S604 and S605 described above, a signal level V2inc2 of the second relative position signal Inc2 at the timing T2 is calculated from the signal level V2s2rA of the second A-phase displacement signal S2rA and the signal level V2s2rB of the second B-phase displacement signal S2rB at the timing T2. Then, the processing proceeds to Step S606.

In Steps S606 and S607, the same processing as that performed in Steps S602 and S603 is performed for the signal level V3s1rA of the first A-phase displacement signal S1rA and the signal level V3s1rB of the first B-phase displacement signal S1rB at the timing T3, which are obtained in Step S507 of FIG. 5. Then, the processing proceeds to Step S608.

Specifically, a signal level V3inc1 of the first relative position signal Inc1 at the timing T3 is calculated from the signal level V3s1rA of the first A-phase displacement signal S1rA and the signal level V3s1rB of the first B-phase displacement signal S1rB at the timing T3.

In Step S608, a movement amount correction is performed by the movement amount calculator 106 by using the signal level V1inc1 of the first relative position signal Inc1 at the timing T1 and the signal level V3inc1 of the first relative position signal Inc1 at the timing T3. Specifically, the movement amount is calculated by using the signal levels V1inc1 and V3inc1, and the signal level V2inc2 of the second relative position signal Inc2 is subjected to extrapolation processing to calculate a signal level V3inc2. The details of the movement amount correction processing are described later.

In Step S609, a Vernier signal Pv1 as shown in FIG. 7D is calculated from the signal level V3inc1 of the first relative position signal Inc1 at the timing T3 and the signal level V3inc2 of the second relative position signal Inc2, which is obtained by the extrapolation calculation. The Vernier signal Pv1 is obtained by calculating a difference between the first relative position signal Inc1 and the second relative position signal Inc2. In the case where the difference has a negative value, the Vernier signal Pv1 is obtained by further performing a calculation of adding Vmax to the negative difference value.

A difference in the number of cycles between the first relative position signal Inc1 and the second relative position signal Inc2 over the full length Lmax is 1. Therefore, the Vernier signal Pv1 becomes a saw-tooth wave having one cycle over the full length Lmax.

After the Vernier signal Pv1 is calculated in Step S609, the processing proceeds to Step S610.

In Step S610, the absolute position Pabs is calculated.

Subsequently, a method for calculating the absolute position Pabs is described.

The signals S1rA, S1rB, S2rA, and S2rB each contain a noise component due to a disturbance and the like. Therefore, the relative position signals Inc1 and Inc2 calculated from the above-mentioned signals also contain a noise component. In order to correct an error component E in the signals, a synchronous computation of the Vernier signal Pv1 and the first relative position signal Inc1 is performed. The synchronous computation is described later. The details of the error component E are described later together with the description of the effects of the movement amount correction.

The synchronous computation is performed to calculate a signal, as a signal Vabs indicating the absolute position, by synthesizing the Vernier signal Pv1 which is an upper-level signal and the first relative position signal Inc1 which is a lower-level signal. The absolute position Pabs is calculated from the signal Vabs. A method for calculating the absolute position Pabs from the signal Vabs is described later.

Next, the synchronous computation is described.

FIGS. 8A to 8D shows how the waveforms change by the synchronous computation described above.

In FIGS. 8A to 8D, the horizontal axis indicates the position on the full length Lmax of the scale, whereas the vertical axis indicates the signal level at the position on the full length Lmax. In addition, the symbol Vmax indicates the maximum value of the signal and, and the symbol N1 indicates a cycle number of a region from a start point of the scale. The number of cycles over the full length Lmax (maximum N1) is defined as N1max. In this embodiment, the first track pattern 203a has forty cycles over the full length Lmax of the scale. Therefore, N1max is 40, where N1 is a natural number ranging from 1 to 40.

Figure 8A:
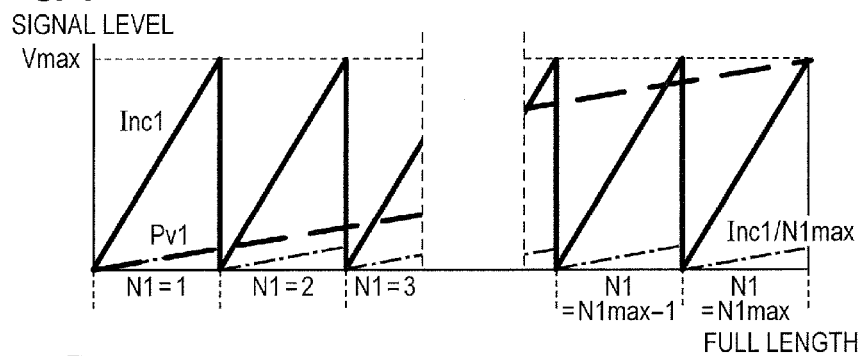
FIG. 8A is a graph showing a waveform change in a synchronous computation.
Figure 8B:
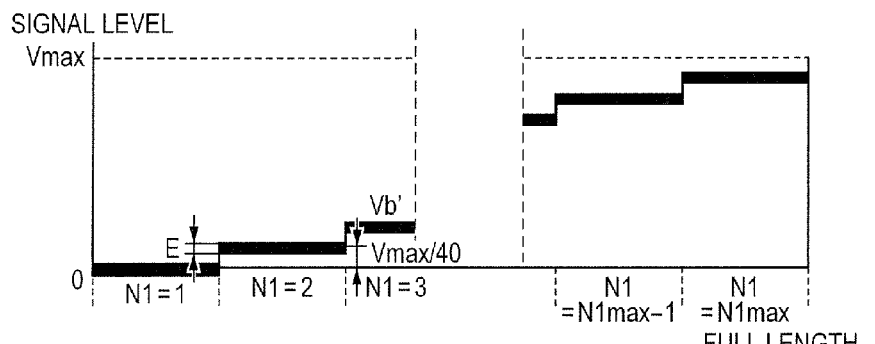
FIG. 8B is another graph showing a waveform change in the synchronous computation.

FIG. 8A shows waveforms of Inc1, Pv1, and Inc1/N1max. When a difference between Pv1 and Inc1/N1max having the same gradient as Pv1 is taken, a step-like waveform containing the error component E shown in FIG. 8B is generated. A signal Vb' having the waveform shown in FIG. 8B is expressed by the following Expression (13). A signal level for one step of the step-like waveform is Vmax/N1max.

$$Vb' = Pv1 - (Inc1/N1max) \qquad (13)$$

Figure 8C:
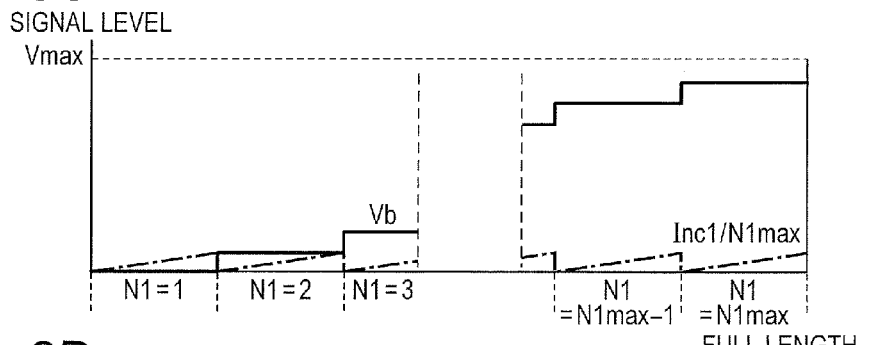
FIG. 8C is a further graph showing a waveform change in the synchronous computation.

Next, the error component E of the waveform shown in FIG. 8B is removed by rounding. Then, a waveform shown in FIG. 8C is obtained. A signal Vb having the waveform shown in FIG. 8C is expressed by the following Expression (14).

$$Vb = \text{Round}[Vb' \times (N1max/Vmax)] \times (Vmax/N1max) \qquad (14)$$

where Round[ ] is a function for rounding off the first decimal place.

The error component E can be expressed by Expression (15).

$$E = [Pv1 - (Inc1/N1max)] - Vb \qquad (15)$$

Figure 8D:
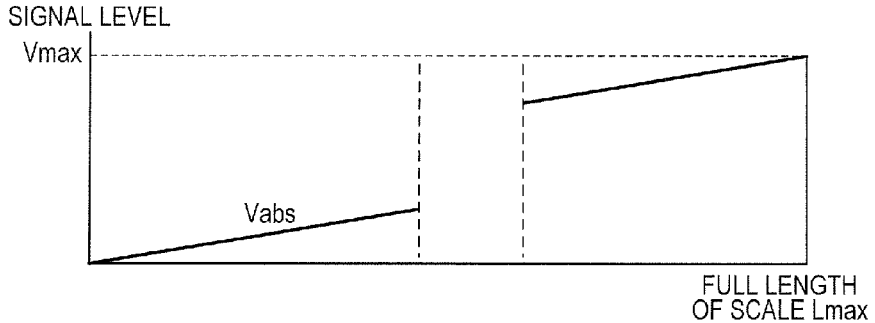
FIG. 8D is a further graph showing a waveform change in the synchronous computation.

The waveform of Inc1/N1max is added to the waveform of the signal Vb shown in FIG. 8C to generate the signal Vabs indicating the absolute position obtained by removing the error component E, as shown in FIG. 8D.

The synchronous computation is performed by a computation expressed by the following Expression (16).

$$Vabs = Vb + (Inc1/N1max) \qquad (16)$$

From the signal Vabs indicating the absolute position, the absolute position Pabs is expressed by Expression (17).

$$Pabs = Vabs \times (Lmax/Vmax) \qquad (17)$$

By the processing in Step S610 described above, the absolute position Pabs at the timing T3 is calculated from the Vernier signal Pv1 and the signal level V3$inc$1 of the first relative position signal Inc1 at the timing T3. Then, the processing proceeds to S611 where the processing ends.

By the processing described above, the absolute position Pabs can be calculated.

Figure 9:
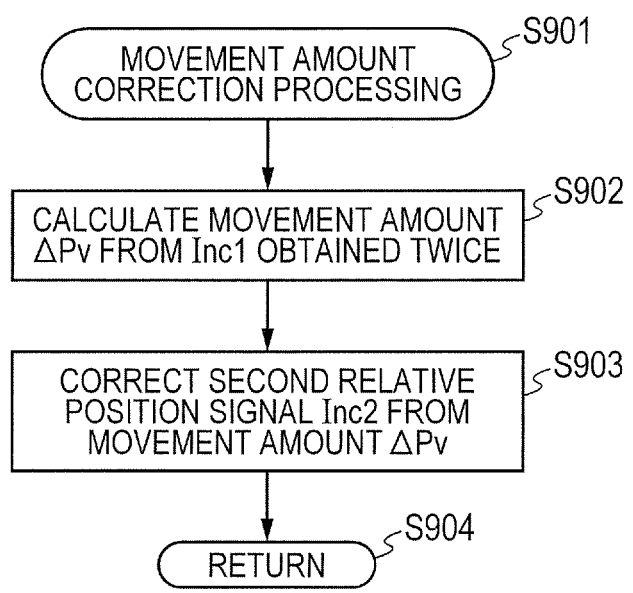
FIG. 9 is a flowchart illustrating a movement amount correction.
Figure 10:
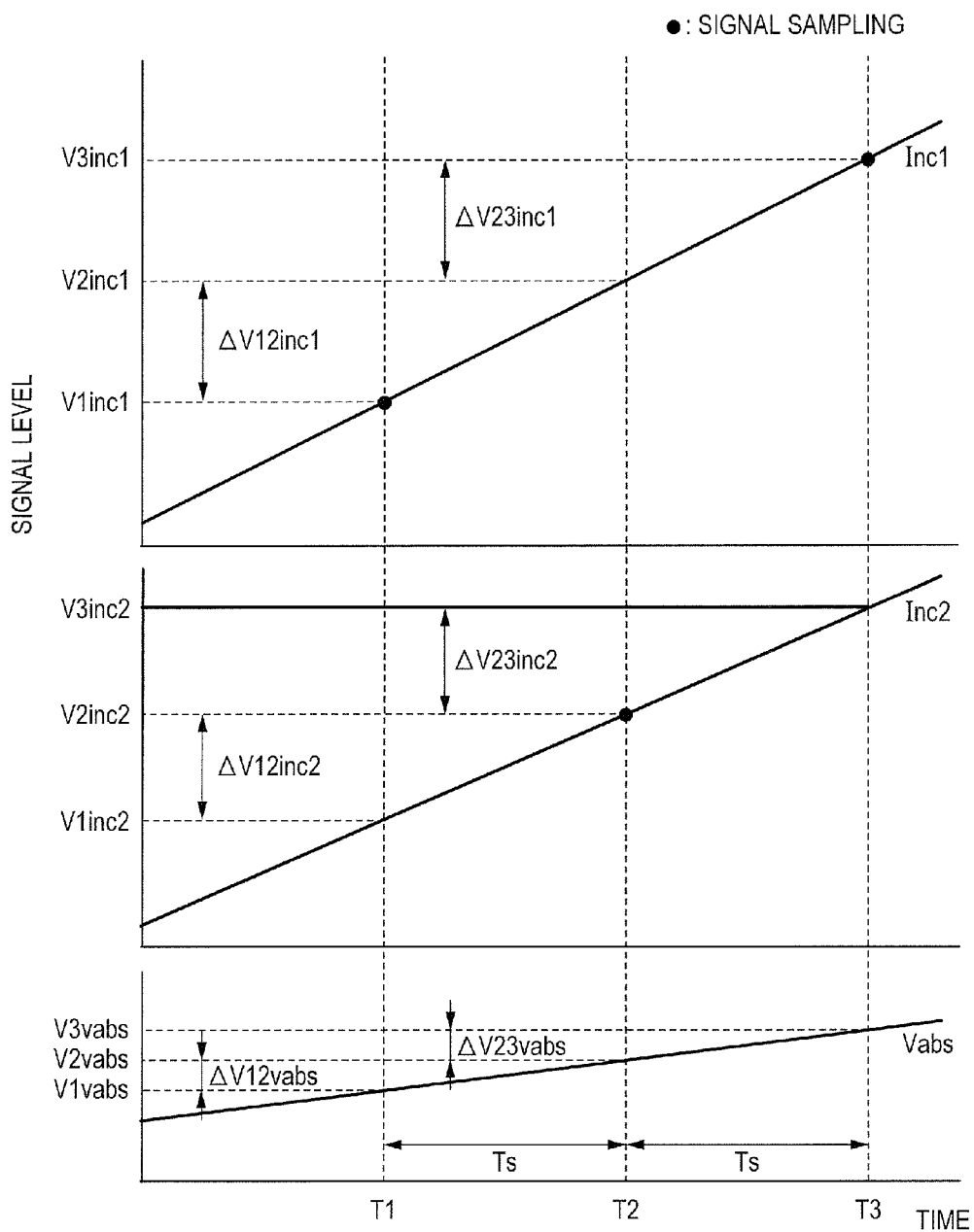
FIG. 10 is a graph showing a relationship between the first relative position signal, the second relative position signal, and the Vernier signal at signal acquisition times.
Figure 11:
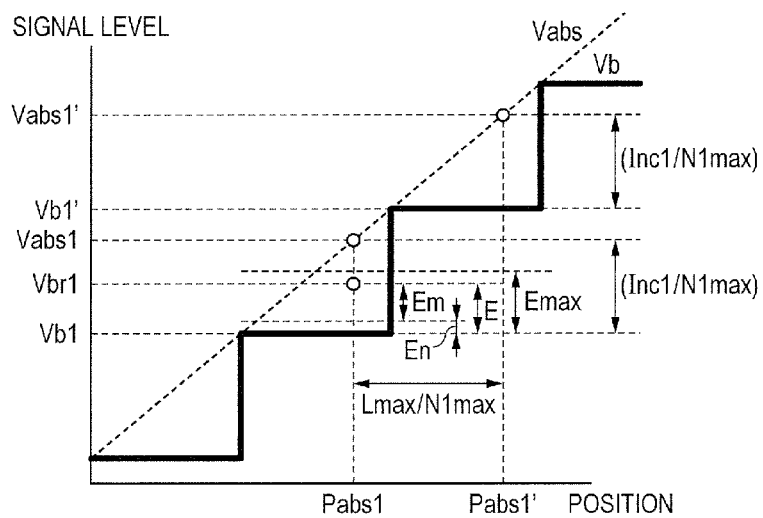
FIG. 11 is an explanatory view illustrating an error component in the synchronous computation.

Next, the details of the movement amount correction processing are described referring to FIGS. 9 to 11. FIG. 9 illustrates a processing flow of the movement amount correction.

In Step S901, the processing starts. Then, the processing proceeds to Step S902.

In Step S902, a movement amount ΔPv is calculated from the signal levels V1$inc$1 and V3$inc$1. Then, the processing proceeds to Step S903. A method for calculating the movement amount ΔPv is described later.

In Step S903, the second relative position signal Inc2 is corrected based on the movement amount ΔPv. Then, the processing proceeds to Step S904. A method for correcting the second relative position signal Inc2 is described later.

In Step S904, the processing ends.

First, the method for calculating the movement amount ΔPv is described.

The movement amount ΔPv is an amount of movement of the movable member 21 between a reference time and a time at which a signal required to be corrected is obtained. The reference time is the time T3 that is obtained lastly when obtaining the multiple signals required to determine the position. The signal required to be corrected is a signal which is not obtained yet at the reference time, that is, at the execution timing T3, and has the signal level V2$inc$2. The signal level V2$inc$2 is calculated from the signal levels V2$s$2$r$A and V2$s$2$r$B, and is obtained at the time T2. Therefore, the movement amount ΔPv is the amount of movement of the movable member 21 between the times T3 and T2.

FIG. 10 shows the relationship between the signal levels of the signals Inc1, Inc2, and Vabs when the movable member 21 is moving. The horizontal axis of FIG. 10 indicates time, whereas the vertical axis indicates the signal level.

The time T1 is a time at which the signals having the signal levels V1$s$1$r$A and V1$s$1$r$B are obtained, the time T2 is a time at which the signals having the signal levels V2$s$2$r$A and V2$s$2$r$B are obtained, and the time T3 is a time at which the signals having the signal levels V3$s$1$r$A and V3$s$1$r$B are obtained. Specifically, as described above, the time T1 is a time at which Step S503 illustrated in FIG. 5 is carried out, the time T2 is a time at which Step S505 illustrated in FIG. 5 is carried out, and the time T3 is a time at which Step S507 illustrated in FIG. 5 is carried out.

A time interval between the times T1 and T2 and a time interval between the times T2 and T3 are signal acquisition delay times Ts, and are the same time interval as each other. The signal acquisition delay time Ts is set to a time period for sufficiently stabilizing the signal to be output after the scale is switched by the scale switching unit 103.

Signal levels V1$vabs$, V2$vabs$, and V3$vabs$ are respectively signal levels of the signal Vabs at the times T1, T2, and T3. The signal levels V1$inc$1, V2$inc$1, and V3$inc$1 are respectively signal levels of the first relative position signal Inc1 at the times T1, T2, and T3. Signal levels V1$inc$2, V2$inc$2, and V3$inc$2 are respectively signal levels of the second relative position signal Inc2 at the times T1, T2, and T3. Among the first A-phase displacement signal S1$r$A, the first B-phase displacement signal S1$r$B, the second A-phase displacement signal S2$r$A, and the second B-phase displacement signal S2$r$B (first signal group), the first A-phase displacement signal S1$r$A and the first B-phase displacement signal S1$r$B (second signal group) are obtained at the times T1 and T3. Then, based on the signal levels V1$s$1$r$A and V1$s$1$r$B of the respective signals S1$r$A and S1$r$B at the time T1 and the signal levels V3$s$1$r$A and V3$s$1$r$B of the respective signals S1$r$A and S1$r$B at the time T3, the signal levels V1$inc$1 and V3$inc$1 of the first relative position signal Inc1 at the times T1 and T3 are obtained. Specifically, the first A-phase displacement signal S1$r$A and the first B-phase displacement signal S1$r$B (second signal group) are obtained over the multiple cycles (that is, at the multiple timings) to obtain the signal levels V1$inc$1 and V3$inc$1 of the first relative position signal Inc1 at the times T1 and T3. Moreover, at the time T2, the second A-phase displacement signal S2$r$A and the second B-phase displacement signal S2$r$B are obtained. Then, based on the signal levels V2$s$2$r$A and V2$s$2$r$B of the second A-phase displacement signal S2$r$A and the second B-phase displacement signal S2$r$B at the time T2, the signal level V2$inc$2 of the second relative position signal Inc2 at the time T2 is obtained.

A change amount ΔV12$inc$1 is a change amount of the signal level of the first relative position signal Inc1 from the time T1 to the time T2. Change amounts ΔV23$inc$1, ΔV12$inc$2, ΔV23$inc$2, ΔV12$vabs$, and ΔV23$vabs$ are defined in the same manner.

The signal acquisition delay time Ts is sufficiently short for a change amount in speed of movement of the movable member 21. Therefore, the speed of movement of the movable member 21 during the signal acquisition delay time Ts can be assumed to be constant. Then, the change amounts ΔV12$inc$1 and ΔV23$inc$1 become equal to each other, and can be expressed by Expression (18).

$$\Delta V12inc1 = \Delta V23inc1 = (V3inc1 - V1inc1)/2 \qquad (18)$$

Moreover, over the full length Lmax of the scale, the signal Vabs has one cycle and the first relative position signal Inc1 has N1max cycles. Therefore, the change amount ΔV12$vabs$ can be expressed by Expression (19).

$$\Delta V12vabs = \Delta V12inc1/N1max \qquad (19)$$

The movement amount ΔPv can be calculated from the change amount ΔV12vabs by Expression (20).

$$\Delta Pv = \Delta V12vabs \times (Lmax/Vmax) \quad (20)$$

Subsequently, the movement amount correction using the movement amount ΔPv is described.

In order to calculate the signal levels of the first relative position signal Inc1 and the second relative position signal Inc2 at the same execution timing, the signal level V3*inc2* of the second relative position signal Inc2 at the execution timing T3 is calculated.

In this embodiment, the signal level of the first relative position signal Inc1 is calculated from the signal levels of the first A-phase displacement signal S1*r*A and the first B-phase displacement signal S1*r*B. Therefore, the signal level of the first relative position signal Inc1 is not required to be calculated independently.

The signal level V2*inc2* of the second relative position signal Inc2 at the execution timing T2 is smaller than the signal level V3*inc2* of the second relative position signal Inc2 at the execution timing T3 by the change amount ΔV23Inc2. Therefore, the signal level V3*inc2* can be calculated by Expression (21).

$$V3inc2 = V2inc2 + \Delta V23Inc2 \quad (21)$$

On the other hand, the change amount ΔV23*inc2* of the signal level of the second relative position signal Inc2 can be calculated from the movement amount ΔPv of the movable member over the signal acquisition delay time Ts by Expression (22). A number N2max indicates the number of cycles over the full length Lmax of the second track pattern 203*b* (maximum value of N2). In this embodiment, N2max is 39.

$$\Delta V23Inc2 = \Delta Pv \times (Vmax/Lmax) \times N2max \quad (22)$$

By the processing described above, the movement amount can be corrected for the signal level V2*inc2* to calculate the signal level V3*inc2* of the second relative position signal Inc2 at the execution timing T3.

Instead of obtaining the change amount ΔV23Inc2 from the movement amount ΔPv as expressed by Expression (22), the change amount ΔV23Inc2 of the signal level of the second relative position signal Inc2 can be directly obtained from the change amount ΔV23Inc1 of the signal level of the first relative position signal Inc1 as expressed by Expression (23).

$$\Delta V23Inc2 = (\Delta V23Inc1/N1max) \times N2max \quad (23)$$

Subsequently, the effects of the movement amount correction are described.

FIG. 11 is an enlarged view of the waveform of FIG. 8C. In FIG. 11, a value Emax is a maximum value of the error component E which can be removed by Expression (14). From Expression (14), the error component E is removed by rounding. Therefore, the maximum value Emax becomes half of Vmax/N1max, and is expressed as Expression (24).

$$Emax = Vmax/(N1max \times 2) \quad (24)$$

A signal level Vbr1 is a signal level calculated by using Expression (13) at an absolute position Pabs1. Signal levels Vb1 and Vb1' are signal levels calculated by using Expression (14) at the absolute position Pabs1. In this case, the signal level when the error component E is appropriately removed by Expression (14) is Vb1, whereas the signal level when the error component E is not successfully and appropriately removed because of the error component E exceeding the maximum value Emax is Vb1'.

When the signal level Vb1 is calculated by Expression (14), the absolute position is calculated as the absolute position Pabs1 by Expression (16). On the other hand, when the signal level Vb1' is calculated by Expression (14), the absolute position is calculated by Expression (16) as a position Pabs1' shifted from the absolute position Pabs1 by Lmax/N1max.

By the processing described above, the absolute position is erroneously calculated. The error component E which does not cause the erroneous calculation of the absolute position is expressed by Expression (25).

$$E < Emax = Vmax/(N1max \times 2) \quad (25)$$

As the error component E, there can be considered an error component En due to the noise component generated by a disturbance to the first A-phase displacement signal S1*r*A, the first B-phase displacement signal S1*r*B, the second A-phase displacement signal S2*r*A, and the second B-phase displacement signal S2*r*B and an error component Em generated by the movement of the movable member 21 over the signal acquisition delay time Ts. The relationship between the error component E, the error component En, and the error component Em is expressed by Expression (26).

$$E = En + Em \quad (26)$$

The error component Em is expressed by Expression (27) using the movement amount ΔPv.

$$Em = N2max \times Vmax \times \Delta Pv/Lmax \quad (27)$$

When the movement amount correction is not performed, the error component Em is generated by the movement of the movable member 21 over the signal acquisition delay time Ts. Therefore, when the speed of the movable member 21 becomes equal to or higher than a given speed, the error component E exceeds the maximum value Emax at which the error component E is successfully removed. As a result, erroneous detection of the absolute position disadvantageously occurs.

On the other hand, when the movement amount correction is performed, the correction for the movement amount ΔPv can be performed. Therefore, the error component Em becomes 0. As a result, even when the movable member 221 is moving, the error component E does not increase. Thus, the erroneous detection of the absolute position does not occur.

By the processing described above, the Vernier type absolute encoder, which can prevent the absolute position from being erroneously calculated while realizing the reduction of the circuit configuration in size, can calculate the absolute position with high reliability.

Second Embodiment

A second embodiment of the present invention is now described referring to FIGS. 12 to 17B.

Figure 12:
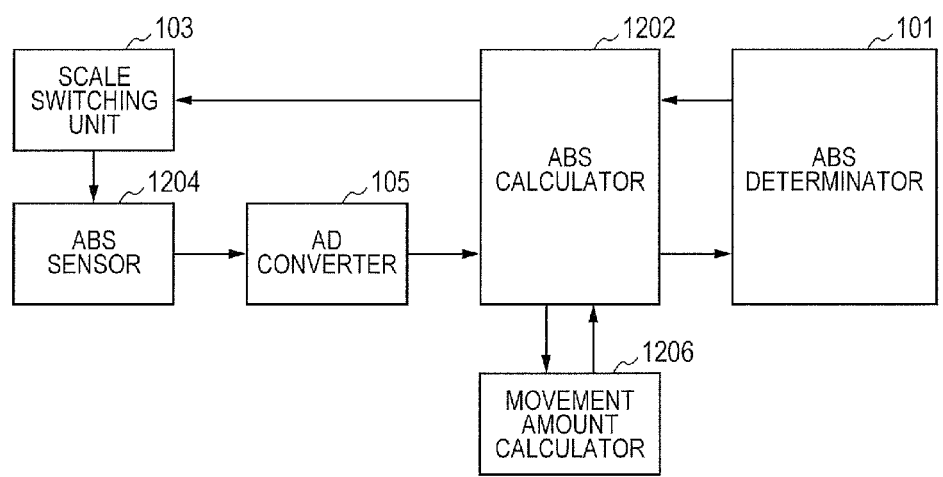
FIG. 12 is a configuration block diagram according to a second embodiment of the present invention.

FIG. 12 is a configuration block diagram of the second embodiment. In FIG. 12, the description of the components having the same configurations as those of the first embodiment is herein omitted.

An ABS calculator 1202 is a computing unit for calculating the absolute position Pabs which is an absolute position of the movable member relative to the fixed member based on a signal output from an ABS sensor 1204.

The ABS sensor 1204 includes a scale unit 1303 having a different internal configuration from that of the first embodiment. The scale unit 1303 is described later.

A movement amount calculator 1206 is a movement amount calculator for calculating the amount of movement of the movable member between the time at which one of two types of signals is obtained and the time at which the other of two types of signals is obtained by the ABS calculator 1202 and for performing a correction. The details of the movement amount correction processing are described later.

Figure 13:
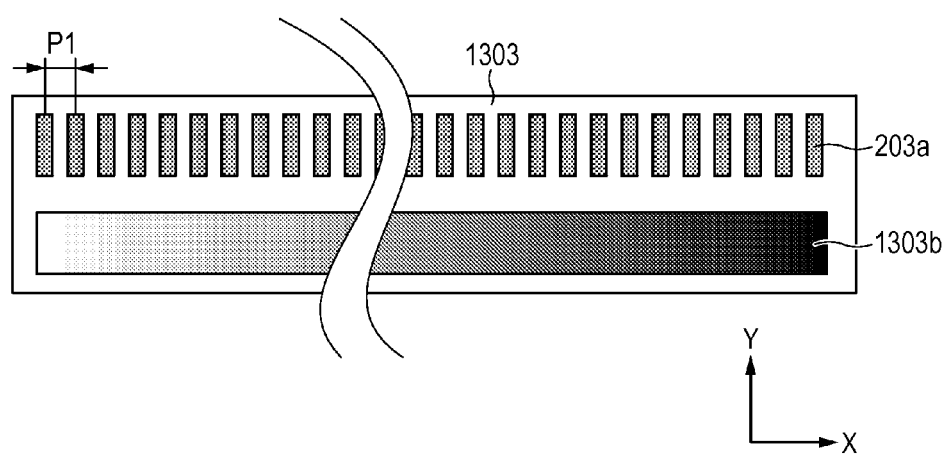
FIG. 13 is a plan view of a scale unit according to the second embodiment.

Subsequently, FIG. 13 is a plan view of the scale unit 1303.

The first track pattern 203a of the scale unit 1303 is the same as that of the first embodiment. A second pattern 1303b is not a track pattern but a gradation pattern in which a reflectance changes uniformly in the direction of movement of the movable member relative to the fixed member over the full length Lmax.

Although the light receiver 204b has the same configuration as that of the first embodiment, the second pattern 1303b has a reflectance changing over the entire area in the direction of the full length Lmax. Therefore, a signal of light which is emitted from the light source, reflected by the second pattern 1303b, and received and output by the light receiver 204b is not a periodic signal, but is a signal indicating a position corresponding to the direction of movement within the full length Lmax in one-by-one fashion (monotonously increasing or monotonously decreasing signal with respect to the position of the movable member).

Figure 14:
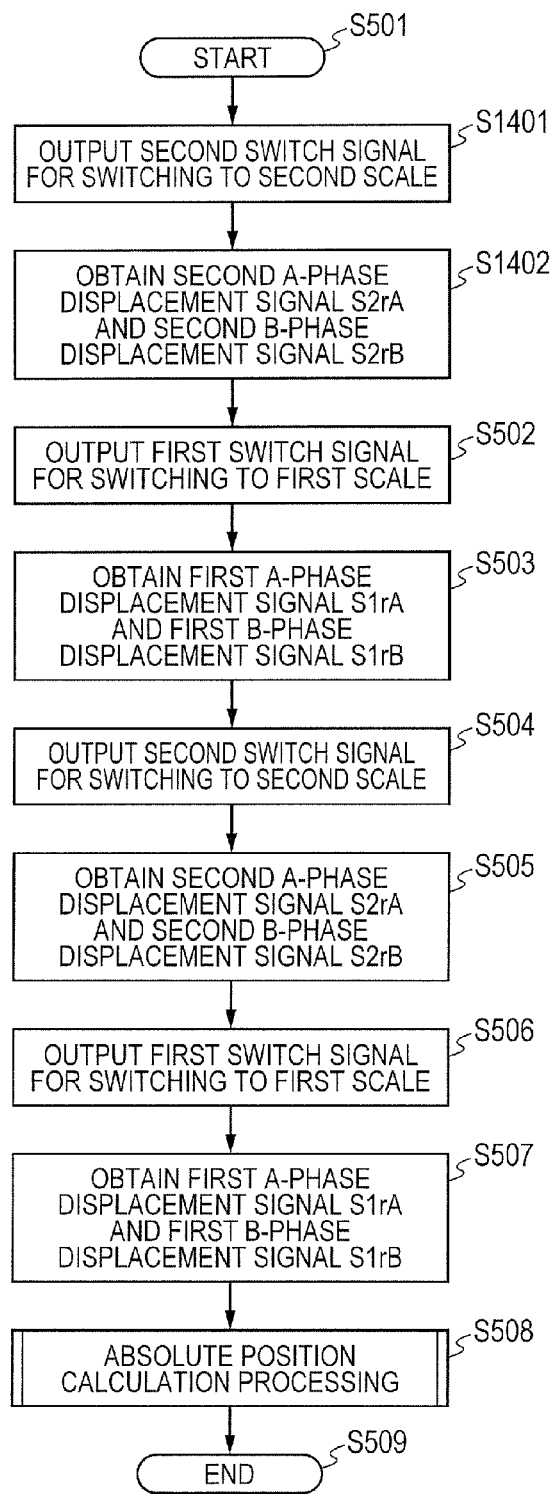
FIG. 14 is a flowchart of signal acquisition according to the second embodiment.
Figure 15:
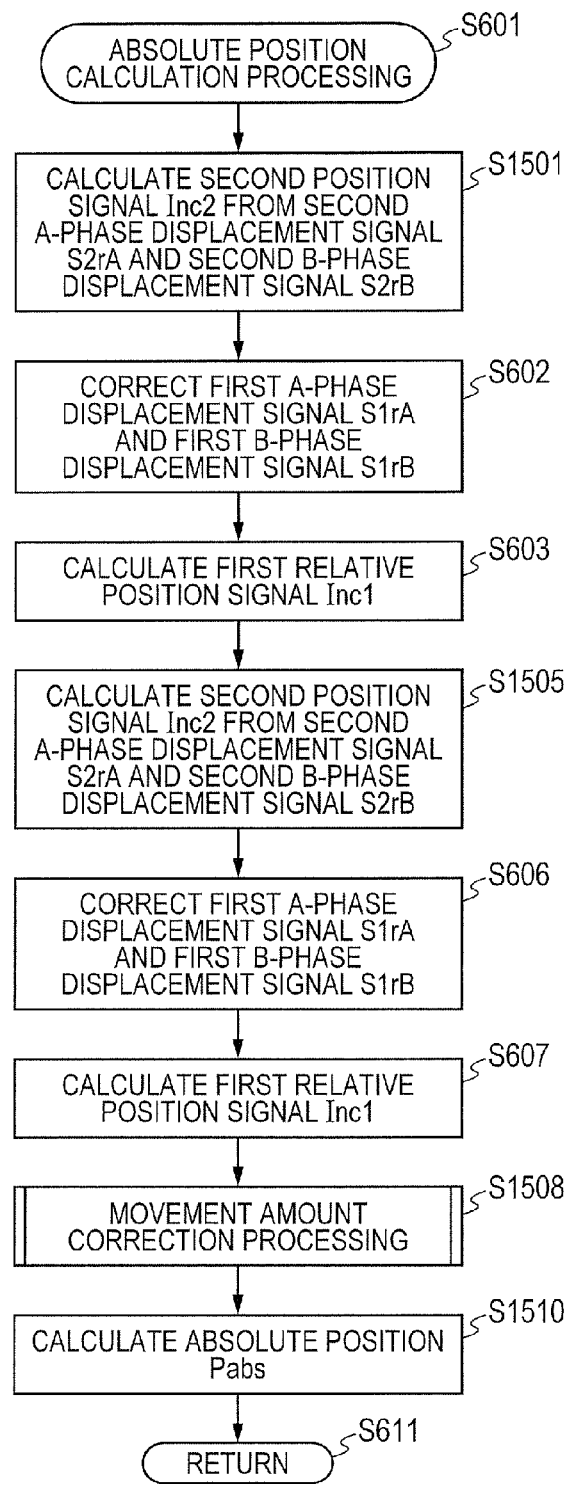
FIG. 15 is a flowchart of absolute position calculation according to the second embodiment.

Next, an operation of the second embodiment is described referring to FIGS. 14 and 15.

FIG. 14 is an operation flow of the ABS calculator 1202. The same operations as those of the first embodiment are denoted by the same reference symbols.

In Step S501, the processing starts. Then, the processing proceeds to Step S1401.

The processing in Steps S1401 and S1402 is the same as that performed in Steps S504 and S505. Then, the processing proceeds to Step S502.

The processing in Steps S502, S503, S504, S505, S506, S507, S508, and S509 is the same as that of the first embodiment.

In the second embodiment, the execution timings and the signal levels to be obtained are defined as follows.

An execution timing of Step S1402 is a time T1, a signal level of the second A-phase displacement signal S2rA to be obtained is V1s2rA, and a signal level of the second B-phase displacement signal S2rB to be obtained is V1s2rB.

An execution timing of Step S503 is a time T2, a signal level of the first A-phase displacement signal S1rA to be obtained is V2s1rA, and a signal level of the first B-phase displacement signal S1rB to be obtained is V2s1rB.

An execution timing of Step S505 is a time T3, a signal level of the second A-phase displacement signal S2rA to be obtained is V3s2rA, and a signal level of the second B-phase displacement signal S2rB to be obtained is V3s2rB.

An execution timing of Step S507 is a time T4, a signal level of the first A-phase displacement signal S1rA to be obtained is V4s1rA, and a signal level of the first B-phase displacement signal S1rB to be obtained is V4s1rB.

Further, a method for calculating the absolute position in Step S508 is described below.

Subsequently, the method for calculating the absolute position in Step S508 is described referring to FIG. 15. The same operations as those of the first embodiment are denoted by the same reference symbols.

In Step S601, the processing starts. Then, the processing proceeds to Step S1501.

In Step S1501, the signal level V1inc2 of the second relative position signal Inc2 at the time T1 is calculated from the signal level V1s2rA of the second A-phase displacement signal S2rA and the signal level V1s2rB of the second B-phase displacement signal S2rB at the time T1. Then, the processing proceeds to Step S602.

The second pattern 1303b is the gradation pattern in which the reflectance changes uniformly in the direction of the movement of the movable member relative to the fixed member over the full length Lmax. Therefore, the second A-phase displacement signal S2rA and the second B-phase displacement signal S2rB become substantially the same. The signal levels of the second A-phase displacement signal S2rA and the second B-phase displacement signal S2rB are determined uniquely for the position on the full length Lmax of the scale. Specifically, the second relative position signal Inc2 is calculated by Expression (28).

$$Inc2=(S2rA+S2rB-t)/b \times V\text{max} \qquad (28)$$

In Expression (28), b is a wave height and t is an offset of a signal obtained by adding the second A-phase displacement signal S2rA and the second B-phase displacement signal S2rB. Specifically, by measuring in the following manner, the values b and t are obtained. More specifically, the wave height b is a difference between a maximum value and a minimum value of the signal obtained by adding the second A-phase displacement signal S2rA and the second B-phase displacement signal S2rB, and the offset t is the minimum value of the signal obtained by adding the second A-phase displacement signal S2rA and the second B-phase displacement signal S2rB.

Therefore, the second relative position signal Inc2 becomes a signal indicating the absolute position which is determined uniquely for the position on the full length Lmax of the scale with respect to the signal level Vmax.

The operations performed in Steps S602 and S603 are the same as those of the first embodiment. After the signal level V2inc1 of the first relative position signal Inc1 at the execution timing T2 is calculated, the processing proceeds to Step S1505.

In Step S1505, the same processing as that performed in Step S1501 is performed to calculate the signal level V3inc2 of the second relative position signal Inc2 at the execution timing T3. Then, the processing proceeds to Step S606.

The operations performed in Steps S606 and S607 are the same as those of the first embodiment. After the signal level V4inc1 of the first relative position signal Inc1 at the execution timing T4 is calculated, the processing proceeds to Step S1508.

In Step S1508, the movement amount correction is performed by the movement amount calculator 1206 using the signal levels V1inc2, V2inc1, V3inc2, and V4inc1. Then, the processing proceeds to Step S1510. The details of the movement amount correction processing are described later.

In Step S1510, the absolute position Pabs is calculated. Then, the processing proceeds to Step S611.

In Step S611, the processing ends.

Subsequently, the movement amount correction processing is described referring to FIGS. 16A, 16B, 17A and 17B.

FIGS. 16A, 16B, 17A and 17B are graphs showing the position on the scale and the signal levels at the execution timings T1 to T4. The horizontal axis of FIGS. 16A, 16B, 17A and 17B indicates a position on the scale, whereas the vertical axis indicates the signal level. The times T1 to T4 are timings at which Steps S1402, S503, S505, and S507 illustrated in FIG. 14 are respectively executed. FIGS. 16A and 16B are the graphs when the movable member is moving at a low speed, whereas FIGS. 17A and 17B are the graphs when the movable member is moving at a high speed.

In order to calculate the signal levels of the signals Inc1 and Inc2 at the same execution timing, the movement amount correction is performed on the signal level V3inc2 of the signal Inc2 obtained at the execution timing T3 to calculate the signal level V4inc2 of the signal Inc2 at the execution timing T4.

A change amount $\Delta V34inc2$ which is required for the correction can be obtained by Expression (29).

$$\Delta V34inc2=(V3inc2-V1inc2)/2 \quad (29)$$

However, it is considered that the noise component is contained in both the signal levels $V1inc2$ and $V3inc2$ due to a disturbance, and hence the change amount $\Delta V34inc2$ cannot be calculated with high accuracy.

Therefore, the change amount $\Delta V34inc2$ is obtained by Expression (30) using the first relative position signal inc1. As a result, the noise component can be reduced so that the change amount $\Delta V34inc2$ can be calculated with high accuracy.

$$\Delta V34inc2=[(V4inc1-V2inc1)/2]/N1max \quad (30)$$

When the movable member is moving at a high speed as shown in FIGS. 17A and 17B, the distance of the movement of movable member corresponds to one cycle of the first relative position signal inc1 or longer. Therefore, the change amount $\Delta V34inc2$ cannot be accurately calculated by Expression (30) described above.

Therefore, the change amount $\Delta V34inc2$ can be calculated with high accuracy and high precision in the following manner by using both the signals inc1 and inc2.

First, when the change amount $\Delta V34inc2$ obtained by Expression (29) is described as a change amount $\Delta V34inc2\_2$ and the change amount $\Delta V34inc2$ obtained by Expression (30) is described as a change amount $\Delta V34inc2\_1$, the number of cycles of the signal Inc1 corresponding to a difference between the change amounts $\Delta V34inc2\_1$ and $\Delta V34inc2\_2$ is calculated. When a value to be calculated is represented by $\Delta Ninc1$, the value $\Delta Ninc1$ can be obtained by Expression (31).

$$\Delta Ninc1=\text{Round}[(\Delta V34inc2\_2-\Delta V34inc2\_1)/(Vmax/N1max)] \quad (31)$$

In Expression (31), Round[ ] is a function for rounding off the first decimal place.

$$\Delta V34inc2=\{(Vmax/N1max)\times\Delta Ninc1\}+\Delta V34inc2\_1 \quad (32)$$

The change amount $\Delta V34inc2$ can be obtained by Expression (32) using the value $\Delta Ninc1$.

Although the correction amount can be calculated with high accuracy and precisely by Expression (32), the calculation becomes complex. Therefore, depending on a conditional branch in Expressions (33), a value employed as the change amount $\Delta V34inc2$ may be changed.

When $Vmax/(2\times N1max)>|\Delta V34inc2\_2-\Delta V34inc2\_1|$ $$\Delta V34inc2=\Delta V34inc2\_1$$

When $Vmax/(2\times N1max)\leq|\Delta V34inc2\_2-\Delta V34inc2\_1|$ $$\Delta V34inc2=\Delta V34inc2\_2 \quad (33)$$

By the processing described above, the position detector using the multiple signals, which can prevent the absolute position from being erroneously calculated while realizing the reduction of the circuit configuration in size, can calculate the absolute position with high reliability.

In the first embodiment, the signals Inc1, Inc2, and Inc1 are obtained in the stated order. Based on the two signals Inc1 sampled at two different times (first timing and final timing), the signal Inc2 which is not collected yet at the time of the second Inc1 data collection is calculated by the extrapolation. The order of the signals is an ideal signal acquisition order in the case where the movement amount (position) of the movable member is measured because a total movement amount during the acquisition of the signals can be measured and averaged. In the case where the movement amount of the movable member within the cycles of data collection is to be specified, when the signal (Inc1 or Inc2) having the shorter cycle (having a larger number of cycles within the full length Lmax of the scale) is used, a resolution is increased. However, when the movement amount of the movable member within the cycle of the data collection is large enough to cover the multiple cycles, the movement amount cannot be specified in a simple manner. Therefore, in such a case, by using the signal (Inc1 or Inc2) having the longer cycle (having a smaller number of cycles within the full length Lmax of the scale) so that the movement amount of the movable member within the cycle of the data collection falls within one cycle, the movement amount can be specified in a simple manner. As described above, when it is desired that the movement amount correction be performed by using the signal Inc1 and the relative position be detected by using the signal Inc2 after the calculation of the absolute position, the signals Inc1, Inc1, and Inc2 are obtained in the stated order. The signal Inc1 at the timing at which the last signal Inc2 is obtained may be obtained by extrapolation from the first obtained Inc1 and the second obtained Inc1 at the two time points. In this manner, when the calculation is switched from the absolute position calculation to the relative position calculation, the signal acquisition delay time for switching the scale by the scale switching unit 103 can be eliminated.

A method for obtaining the effects of the movement amount correction is not limited to that described above. The data may be obtained in the order of the signals Inc1, Inc2, Inc1, and Inc2. The movement amounts $\Delta Pv$ may be calculated respectively from the signals Inc1 and the signals Inc2, each being obtained twice, and averaged for the correction.

Moreover, although the configuration using the encoder having the two track patterns having different pitches has been described, the configuration is not limited thereto. A configuration using three or a larger number of encoders may be employed.

Further, although the combination of the means of detecting the absolute position and the means of detecting the displacement signals based on the track patterns has been described in the second embodiment, the present invention is not limited thereto. For example, in the case of a position detector for detecting a position by using three encoders, which has a configuration in which three types of signals, that is, a dense signal, an intermediate signal, and a coarse signal, are output, the functions and effects of the present invention can be obtained. Specifically, in this case, each of the dense signal and the coarse signal is obtained twice. The correction amount is approximated with the coarse signals and the accuracy is enhanced with the dense signals.

In the embodiments described above, the position detector having the configuration in which the two signals are sequentially switched to be output has been described. However, the configuration of the position detector is not limited thereto. For example, the same effects can be obtained even by a configuration in which reading of the signals by a CPU is sequentially switched for multiple position detectors for independently outputting the signals.

Specifically, by using a position detector obtained by combining a position detector for detecting the absolute position and another position detector such as an encoder, the same effects can be obtained by the movement amount correction. As the position detector for detecting the absolute position, a potentiometer or a position detector using a conductive pattern and a conductive brush is considered, for example.

Moreover, although the embodiments in which the optical encoder is used as the encoder have been exemplified, the present invention is not limited to the embodiments described above. A magnetic encoder may be used instead.

Further, although the position detector for calculating the absolute position has been described as an example, the same effects can be obtained by a position detector having multiple cycles over the entire area.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-068082, filed Mar. 28, 2013, which is hereby incorporated by reference herein in its entirety.

What is claimed is:

1. A position detector which detects a position of a movable member relative to a fixed member,
   the position detector comprising:
   a signal detector configured to detect multiple periodic signals each indicating a predetermined value for the position of the movable member;
   a signal processor configured to generate multiple displacement signals based on the multiple periodic signals detected by the signal detector and switch the multiple generated displacement signals in a predetermined cycle to sequentially output the multiple displacement signals;
   a position calculator configured to calculate the position of the movable member based on a first signal group, the first signal group being the multiple displacement signals sequentially output by the signal processor; and
   a movement amount calculator configured to calculate a movement amount of the movable member within the predetermined cycle, wherein:
   the first signal group contains a second signal group formed by obtaining the same displacement signal at different times;
   the movement amount calculator calculates the movement amount of the movable member within the predetermined cycle by using the second signal group; and
   the position calculator calculates the position of the movable member based on the first signal group and the movement amount.

2. A position detector according to claim 1, wherein:
   the signal processor outputs a signal of the second signal group as a first output signal and a last output signal when the first signal group is output over a plurality of the predetermined cycles; and
   the movement amount calculator uses the second signal group formed by obtaining the same displacement signal at the different times to calculate the movement amount of the movable member within the predetermined cycle.

3. A position detector according to claim 1, wherein:
   the signal processor outputs a signal of the second signal group as a first output signal and a second last output signal when the first signal group is output over a plurality of the predetermined cycles; and
   the movement amount calculator uses the second signal group formed by obtaining the same displacement signal at the different times to calculate the movement amount of the movable member within the predetermined cycle.

4. A position detector according to claim 1, wherein the first signal group comprises the multiple periodic signals having different cycles.

5. A position detector according to claim 1, wherein:
   the first signal group comprises the multiple periodic signals having different cycles; and
   the second signal group comprises the periodic signal having the shortest cycle among the multiple periodic signals of the first signal group.

6. A position detector according to claim 1, wherein the signal detector comprises:
   multiple reflective pattern arrays having different cycles, which are provided to one of the fixed member and the movable member;
   a light source fixed to the other of the fixed member and the movable member; and
   multiple light receivers fixed to the other of the fixed member and the movable member, respectively for receiving light emitted from the light source and reflected by the multiple reflective pattern arrays.

7. A position detector according to claim 1, wherein:
   the first signal group contains the multiple periodic signals; and
   the second signal group comprises one of a monotonously increasing signal and a monotonously decreasing signal with respect to the position of the movable member.

8. A position detector according to claim 1, wherein the signal processor comprises a switching unit for outputting a switch signal to the signal processor so as to switch the multiple periodic signals in the predetermined cycle and sequentially output the multiple periodic signals.

* * * * *